(12) United States Patent
Horst et al.

(10) Patent No.: US 10,106,279 B2
(45) Date of Patent: Oct. 23, 2018

(54) FILM CUTTER FOR IN-LINE HAY BALE WRAPPER

(71) Applicant: TUBE-LINE MANUFACTURING INC., Elmira (CA)

(72) Inventors: Paul M. Horst, Elmira (CA); Oscar M. Frey, Listowel (CA)

(73) Assignee: TUBE-LINE MANFACTURING LTD., Elmira, Ontario (CA)

( * ) Notice: Subject to any disclaimer, the term of this patent is extended or adjusted under 35 U.S.C. 154(b) by 355 days.

(21) Appl. No.: 14/870,779

(22) Filed: Sep. 30, 2015

(65) Prior Publication Data

US 2016/0183473 A1 Jun. 30, 2016

(30) Foreign Application Priority Data

Sep. 30, 2014 (GB) .................................. 1417296.9

(51) Int. Cl.
*A01F 15/07* (2006.01)
*B65B 11/00* (2006.01)
*A01F 25/14* (2006.01)

(52) U.S. Cl.
CPC ............ *B65B 11/008* (2013.01); *A01F 25/14* (2013.01); *A01F 2015/0725* (2013.01); *A01F 2025/142* (2013.01)

(58) Field of Classification Search
None
See application file for complete search history.

(56) References Cited

U.S. PATENT DOCUMENTS

| | | | | |
|---|---|---|---|---|
| 4,676,048 A * | 6/1987 | Lancaster | ............ | B65B 11/008 53/210 |
| 5,447,009 A * | 9/1995 | Oleksy | ................. | B65B 11/045 53/375.9 |
| 5,452,566 A * | 9/1995 | Benhamou | ............ | B65B 11/025 53/389.3 |
| 5,765,344 A * | 6/1998 | Mandeville | ........... | B65B 11/025 53/389.3 |
| 5,768,862 A * | 6/1998 | Mauro | .................. | B65B 11/025 53/556 |
| 6,082,076 A * | 7/2000 | Anderson | ............. | A01F 15/071 53/176 |
| 6,289,652 B1 * | 9/2001 | Lancaster, III | ....... | B65B 11/008 53/176 |
| 6,393,808 B1 * | 5/2002 | Kallner | ................. | B65B 11/025 53/135.3 |
| 6,910,315 B2 * | 6/2005 | Suolahti | ................ | B65B 11/025 53/170 |
| 2001/0029725 A1 * | 10/2001 | Suolahti | ................ | B65B 11/025 53/589 |
| 2002/0029540 A1 * | 3/2002 | Lancaster, III | ....... | B65B 11/008 53/399 |
| 2002/0124529 A1 * | 9/2002 | van der Lely | ........ | A01F 15/071 53/411 |

(Continued)

FOREIGN PATENT DOCUMENTS

CA 2270146 2/2003
CA 2453035 6/2004
(Continued)

*Primary Examiner* — Hemant M Desai
*Assistant Examiner* — Tanzim Imam
(74) *Attorney, Agent, or Firm* — Anthony Asquith Corp.

(57) ABSTRACT

An in line bale hay bale wrapper with an selective automatic film cutter.

16 Claims, 5 Drawing Sheets

(56) References Cited

U.S. PATENT DOCUMENTS

| | | | | |
|---|---|---|---|---|
| 2006/0260279 A1* | 11/2006 | Jafari | ............ | B65B 11/025 53/399 |
| 2007/0220840 A1* | 9/2007 | Pecchenini | ......... | B65B 11/008 53/588 |
| 2008/0264031 A1* | 10/2008 | McHale | ............ | A01F 15/071 56/341 |
| 2012/0102881 A1* | 5/2012 | Moore | ............ | B65B 11/008 53/399 |
| 2014/0263526 A1* | 9/2014 | Yu Chen | ............ | B26D 1/185 225/39 |

FOREIGN PATENT DOCUMENTS

| | | |
|---|---|---|
| EP | 0427039 | 10/1990 |
| EP | 0539549 | 8/1996 |
| EP | 1648217 | 4/2006 |
| EP | 10803345 | 7/2007 |
| WO | WO-1995/34196 | 12/1995 |

* cited by examiner

FILM CUTTER FOR IN-LINE HAY BALE WRAPPER

FIELD OF INVENTION

This invention relates to automatic machinery for the wrapping of hay bales into tube-like horizontal silos.

BACKGROUND AND PRIOR ART

Farming of crops of hay has changed radically in the last 3 decades away from permanent storage facilities or fully exposed bales. Currently, cut hay is predominantly rolled in to large cylindrical bales whose diameter is greater than their height. These cylindrical bales are very tightly rolled and are bound into the final shape so as to exclude air and water and to provide for ready movement with large scale equipment as the finished bales can weigh more than 1 ton and be valued at as much as $250 in some regions, each.

To provide for centralized storage and natural curing, the bales are arranged axially, more or less, along the surface of the ground into a laterally arranged tubular array while being simultaneously wrapped in 1 or more layers of plastic film. Automatic machinery is known in the art for this purpose which are adapted to receive individual bales sequentially, and then to compress each new bale on to the end of the axial array of bales and then to wrap the array continuously by rotating supplies of plastic film. Once wrapped the axial array of bales is lowered axially and vertically on to the receiving surface without breaking the seal of the film or the film itself.

As the bale array is advanced the film supply is spirally wound around the main axis in 1 or more individual layers each of which will overlap at least 1 of layer from the previous wrap.

Problematic situations occur when the ground is not level and at the beginning and end of each tubular array. When such situations occur additional wraps my be included by slowing down or stopping the advance of the baler whereby the pitch of spiral may be reduced even to 0 thereby wrapping the bale array in a multi-layer cylindrical fashion.

Even more problematic are the $1^{st}$ and last bales in an array as the whole array must be kept completely sealed from weather so as to process correctly without losses. Thus, the $1^{st}$ and last bales are fitted with an end cap which is fed through the wrapper to start or finish an in line array. Wrapping the last bale is problematic as the sheet film must not only overwrap the helix but also must permanently seal the end of the array by extending upstream of the array enough to stretch and seal with the end cap across at least a portion of its final transverse surface.

Such wrapping machines should be operated with great care and patience as the loads and stresses are very high and the moving parts include steel structures which operate rotationally in the open at high relative speeds. Farming efficiency and the vagaries of the weather dictate that wrapping should proceed not only carefully and uniformly but at high and continuous rates of production. Typical farming operations such as this one are conducted on long work shifts often in inclement conditions. Operators must be fully trained and operate strictly in accordance with planned procedures.

All of the rotating parts of the bale wrapper are separated from operator work space by substantial guards which must remain in place before the wrapper severance of the film is required at the trailing end of any bale line. Known machines have left severance of the film and associated termination activities to the user as a manual operation. This involves full stoppage of the wrapper, isolation of hydraulic circuits, removal of machinery guards, manual tearing of the film well inside the outer boundary of the rotating parts and return of the guards. On occasion, operators have been known to ignore machinery guards to reach inside the outer boundary, an entirely unsafe procedure with catastrophic consequences in the event of unplanned actions. This is particularly so where more than 1 layer of film is being applied from 2 or more rotary supply stations where stoppage and severance of the film must procedure in 2 or as many as 4 individual steps.

In more detail, manual severance requires:
(a) stopping the machine feed at the end of supply while still within the cylindrical boundary of the film supply,
(b) this stops machine travel and, thus, the continuous double helix of the wrapping material,
(c) rotary film travel is stopped,
(d) the operator then attends the film area of the machine,
(e) the film area guard is slid laterally to expose the film supply and completely cover the operational controls,
(f) the film is manually torn or cut starting at the downstream side and working across the surface of the film in a generally upstream direction,
(g) the film area guard is slid laterally to its original condition,
(h) the rotary film travel is re-started for 1-2 cycles, and
(i) these steps are repeated.

STATEMENT OF THE INVENTION

The invention provides a film cutter for use on rotary hay bale wrappers which is simple and safe to use.

In another aspect the invention provides a film cutter which automatically severs the film while rotating, preferably commencing at the downstream edge, wherein:
the operator is not required to reach in to the operational mechanisms of the machine,
the film area guards do not need to be displaced for end of wrap activities
the film ends are torn uniformly while maintaining the system tension on the film itself, throughout.

In yet another aspect of the invention the film cutter provides a ½ width cutter bar wherein:
(a) cylindrical tearing commences and continues under full tension in that area with the maximum overlap and, thus, maximum compressive force and maximum axial (axial to the bale array). The tear has a tendency to be axially across the face of the film while the film tension is tangential,
(b) the end of bail array tearing is continued under full rotary action as the line of tear continues across the film surface generally at an angle to both the axial direction and the tangential angle,
(c) this $2^{nd}$ part of the tearing adds to the axial extension of that part of the film across the least overlapped portions of the bale cylinder and tightens the wrap axially as between the bale cylinder wrap and the end cap, thereby tending to tighten the end cap onto the bale array cylinder.
(d) the operator is relieved of an end-of-day manual operation on the internal workings of the baler at a time and place where simple tiredness becomes a substantial safety factor. Automatic operation decreases the likelihood that the operator will seek to get around the safety gate features without taking all of the safety steps.

(e) film inter-layer adherence and overall film barrier security are improved at the critical end point of the inline bale array by maintenance of specific film extension until the last possible moment at the end of the bale line array.

The invention provides an in-line bale wrapping machine including a bale receiving support, a rotary hoop support rotationally carrying at least one plastic film supply carriage for rotation about the direction of travel of the said wrapping machine, including a frame and at least one film spool support and a corresponding film tensioning structure, and, a film cutter mounted to the frame operative to sever tensioned film supplied from the spool support and film tensioning structure to said bale downstream of said film tensioning structure.

In another aspect the invention provides a wrapping machine with a film cutter is operative between a first position with no film contact and a second position wherein said film cutter severs a tensioned film, preferably in continuous rotary supply.

In yet another aspect the film cutter rotates with the frame during wrapping operations biased into said first position and includes a film cutter actuator structure external to said film supply carriage, preferably acting in the direction of travel of the machine.

In yet another aspect the invention provides an external actuator which selectively interferes with a rotating trip lever and trip linkage mounted to the frame during rotation.

DRAWINGS

DESCRIPTION OF THE PREFERRED EMBODIMENT

Figure 1:
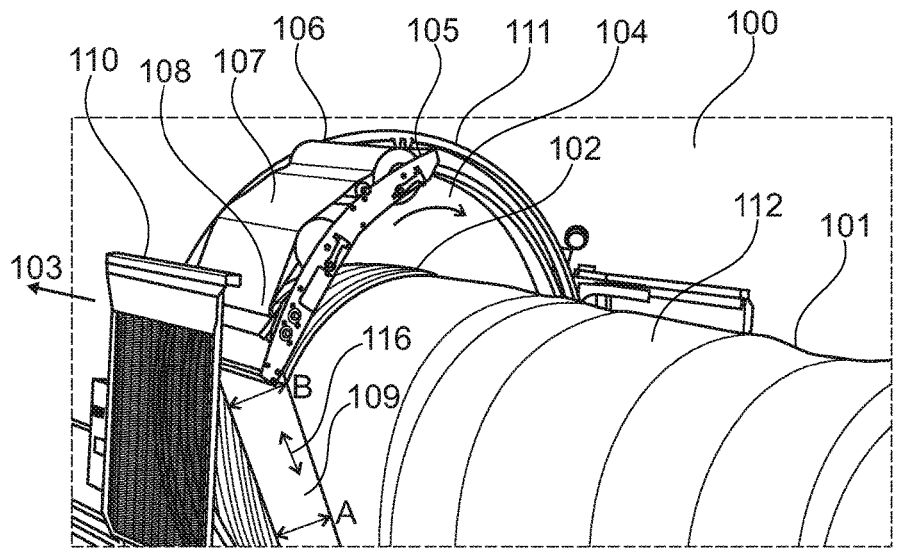
FIG. 1a is a pictorial view of a single station, 2 layer, rotary feed in operational condition.
FIG. 1b is a pictorial view of a manually severed film according to the prior art.
Figure 1:
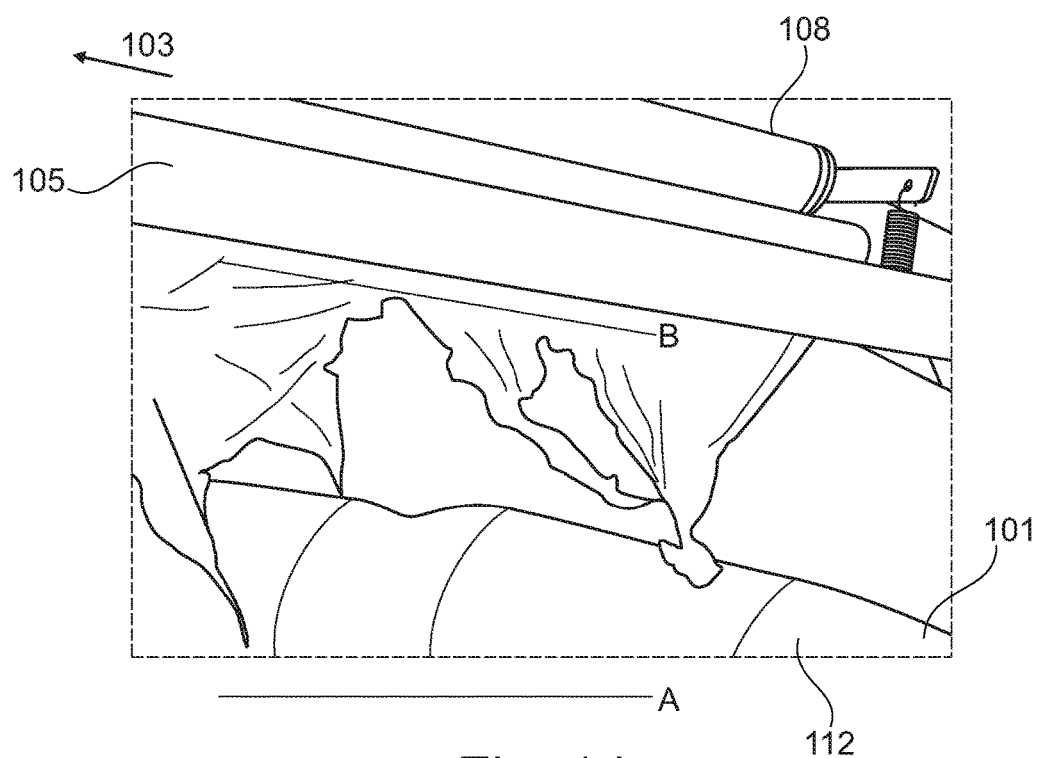

FIG. 01a shows a prior art in line bale wrapper in operation. An in-line cylindrical bale array 101 is shown helically wrapped as it is driven hydraulically off the rear of the wrapper 100 as the wrapper moves forward axially along direction 103.

Individual bales 102 are added to the wrapper upstream and driven backwards into the bale array 101.

Wrapper 100 includes a rotary frame 111 and at least one film supply carriage 105 which is driven in this case clockwise in rotational direction 104 around the bale array 101 while it is advanced rearwards along axis 103.

Figure 2:
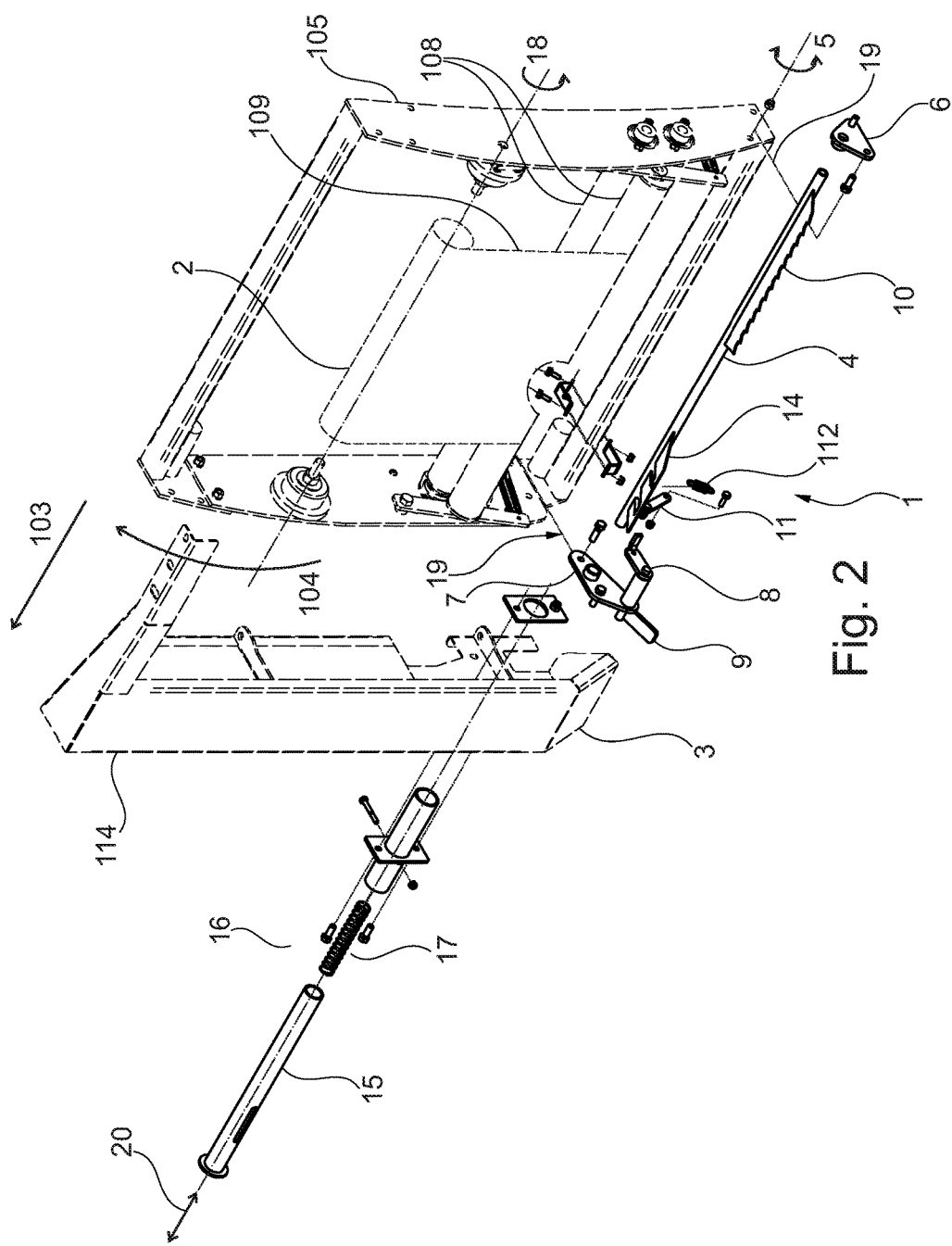
FIG. 2 is an exploded perspective view of the film cutter of the preferred embodiment in juxtaposition with the main wrapper frame (stationary) and the rotary feed supply frame.

In the case shown in FIG. 01a 2 sheets of plastic film are simultaneously drawn from rolls 106 and 107 mounted to carriage 105 to form a 2-layer helical wrap as at 112.

As carriage 105 is driven around bale array 101 sheet film from both supply rolls 106 and 107 are engaged between nip rollers 108 so as to provide tangential stretching of film 109 along line A-B in FIG. 01.

The whole of the operational area is secured behind a removable safety gate 110.

FIG. 01b shows the effect of a manual tear 117 as in the prior art. Once the rotary wrapping is disengaged the tension in film tangential to the bale 116 is reduced and may go to zero in the area A through B in FIG. 01a. This severed film is then rewrapped in the event of multiple supply rolls as the rotation is advanced for that roll to be severed leaving small interticies in the wrap.

FIG. 02 shows a partially exploded perspective view of the preferred embodiment of the film cutter of invention 1.

In this case film supply carriage 105 carries a single film supply roll 2 along with nip rollers 108. Supply roll 2 is mounted for rotation counterclockwise of the direction of travel 103 to frame 105 for rotation about axis 18 as film 109 is drawn from spool 2. A fixed portion of machine frame is shown at element 3. Film 109 then passes around and through nip rollers 108 so as to tension the supply film in region A-B (FIG. 1).

Rotary cutter bar 4 is mounted to carriage 105 for rotation about axis 5 by end plates 6 and 7. Axis 5 is parallel to the direction of travel of the machine 103 and rotates in unison with frame 105 and supply spool 2 clockwise about direction of travel 103.

Figure 3:
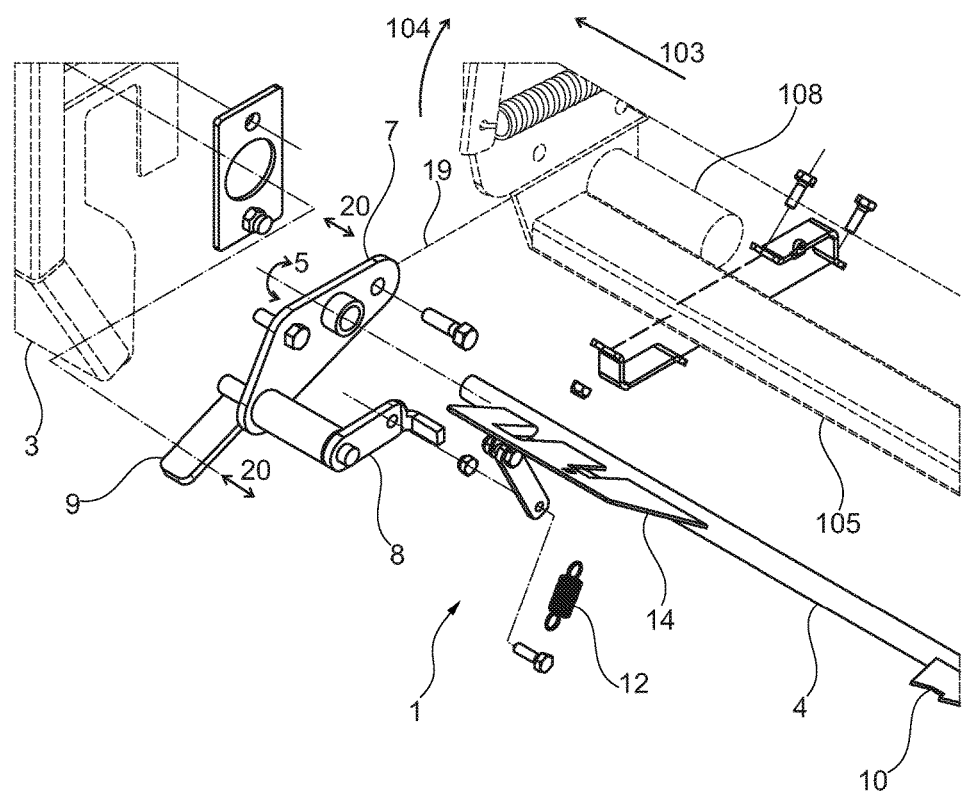
FIG. 3 is an expanded view of a portion of the film cutter of FIG. 2.

In FIGS. 2 and 3 rotary cutter bar 4 is shown as at 19 offset from and parallel to axis 5 for ease of description.

End plate 7 is fastened to the frame 105 and includes a crank handle 8 and trip lever 9 held in disengaged position 10 as shown in FIG. 02 by trip linkage 11 acting between the cutter bar 4 and the crank handle 8 biased by spring 12. Linkage 8 includes crank arm 8 pivotally engaged with trip lever 9 on end plate 7.

Mounted to cutter bar 4 are axial cutter blade 10 and lever arm 14.

Activation rod 4 is mounted to main frame 114 as at location 3 for axial movement 20 parallel to the direction of travel of the machine 103, non rotating, from the fully retracted and disengaged position 16 shown in FIG. 02. Activation rod 15 is biased into the disengaged position 16 by spring 17 acting against frame 114.

Figure 4:
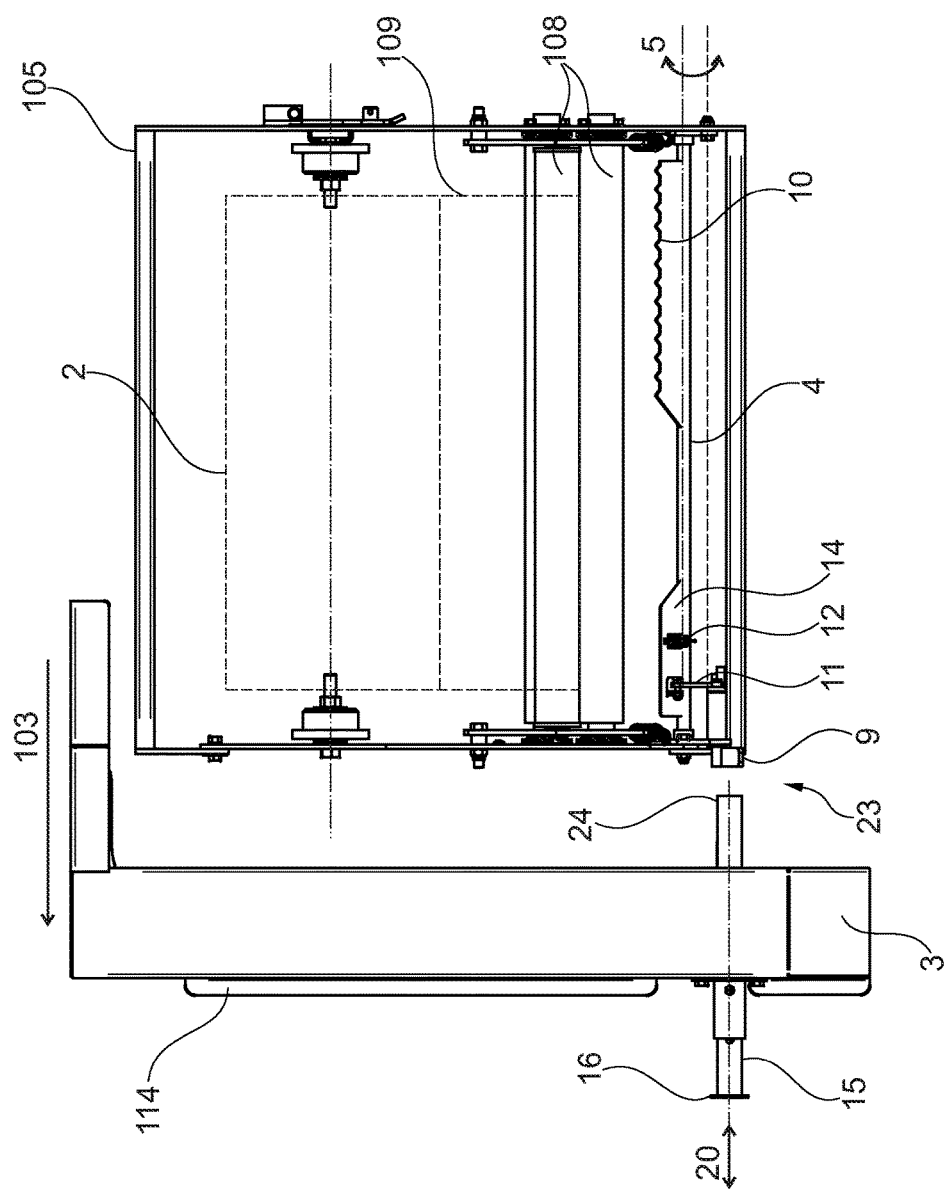
FIGS. 4 and 5 are plan views of the film cutter of the preferred embodiment before and after, respectively, the cutter is tripped.

FIG. 4 shows a plan view of the film cutter of the preferred embodiment in disengaged position as shown in FIGS. 2 and 3. Activation rod 4 is biased forward on the machine frame 114 as at 15 on the frame 114 providing a gap 23 between rod end 24 and trip lever 9, permitting rotation of frame 105 interference free.

Figure 5:
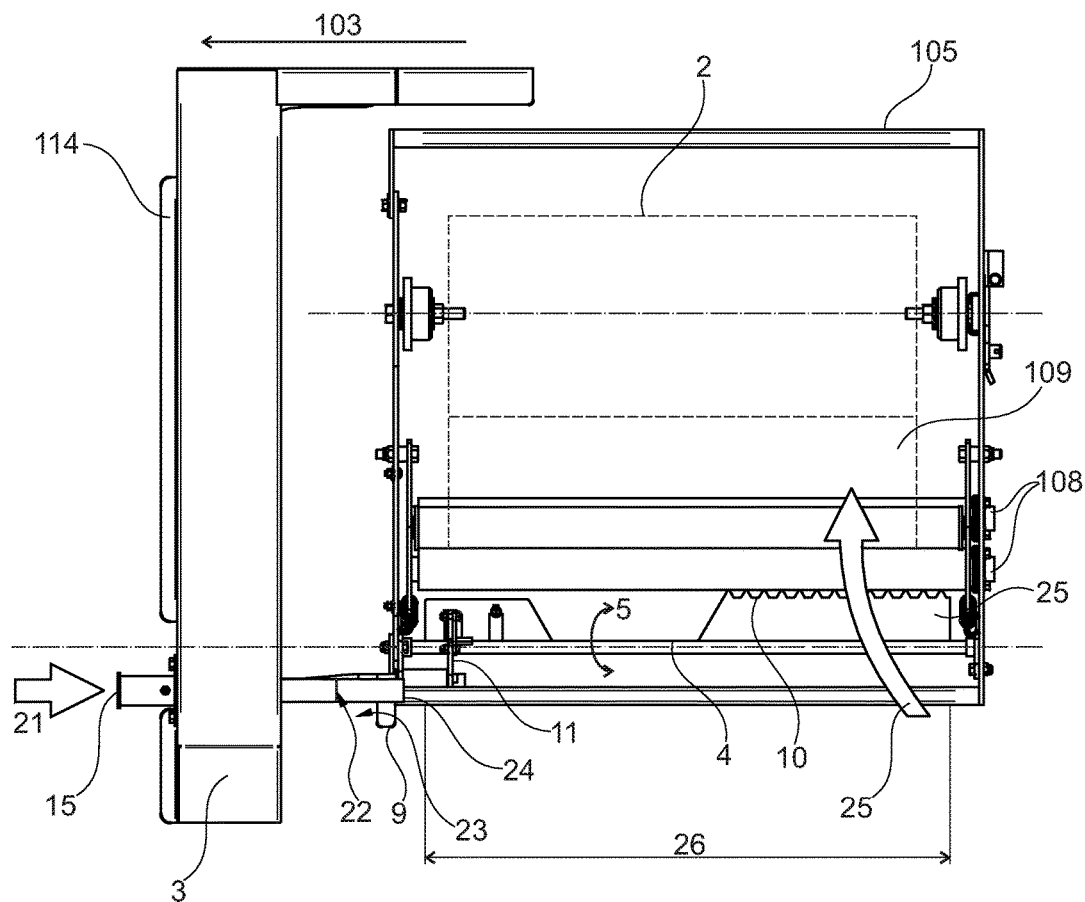

As shown in FIG. 5 activation of rod 4 rearwards as at 21 along direction 103 extends rod end 24 into an interference pathway 22 with trip lever 9. As trip lever 9 rotates with film carriage 105 it contacts rod end 24 for a period of angular rotation interference causing linkage 8 to rotate cutter bar 4 about bar axis 5 as at 25 and thus cutter blade 10 into temporary engagement with the tensioned wrapping film 109.

Preferably cutter blade 10 extends only a portion of the length 26 of cutter bar 4. Preferably it extends only along the upstream (to the machine advance along 103) side of film 109.

As can be seen, temporary engagement of tensioned film 109 from rotating supply frame 105 with cutter blade 10 commences a tearing severance of film 109, preferably while the frame 105 is still rotating, which maintains the remaining unsevered film under tension until the tear is complete. Most preferably this severance occurs while the bale line 112 is not advancing rearwards as shown in FIG. 1. Placement of the last bale in the correct alignment permits the wrapper to overlap the last film wraps, fully under tension, and preferably including a portion across the transverse end of the last bale (transverse to the direction of travel 103).

While particular embodiments of the present invention have been shown and described, changes and modifications may be made to such embodiments without departing from the true scope of the invention. For example, the number of hoops used, the design, or the rotating direction of the bale wrapping device may be also modified. In the stretching device, the number of rotating frames, rollers and arrangement of the rollers may be changed. The number of contiguous or adjacent plastic strips used and arrangement of the may be also changed.

We claim:

1. An in line bale wrapping machine including:
   a bale receiving support which receives a plurality of bales in line and transports the bales through a rotary hoop support rotationally carrying at least one plastic film supply carriage for rotation about an axis parallel to a direction of travel of said wrapping machine, said at least one plastic film supply carriage including a frame and at least one film spool support and a corresponding film tensioning structure, and
   a film cutter mounted on said frame between said film tensioning structure and a bale, wherein the film cutter rotates with said frame during wrapping operations of the machine, wherein the film cutter is movable between a first position with no film contact and an operative second position in which said film cutter severs a tensioned film supplied from said at least one film spool support and said film tensioning structure to said bale, and
   wherein said bale receiving support includes a film cutter actuator structure external to said at least one plastic film supply carriage.

2. An in line bale wrapping machine as claimed in claim 1 wherein said film cutter actuator structure is separated from said at least one plastic film supply carriage and said rotary hoop support by a frame mounted on said bale receiving support.

3. An in line bale wrapping machine as claimed in claim 1 wherein said film cutter actuator structure selectively interferes with a trip lever and a trip linkage mounted on said frame during rotation of said at least one plastic film supply carriage, and wherein said trip lever is a trip tab rotating with said at least one plastic film supply carriage and said trip linkage is a linkage driving said cutter into said second position.

4. An in line bale wrapping machine as claimed in claim 3 wherein said film cutter actuator structure operates in the direction of travel of said wrapping machine.

5. An in line bale wrapping machine as claimed in claim 3 wherein said cutter includes an axle oriented parallel to the direction of travel of the said wrapping machine.

6. An in line bale wrapping machine as claimed in claim 5 wherein said axle is driven by said trip linkage into rotation from said first position to said second position upon said selective interference and thereby drives said cutter into said second position.

7. An in line bale wrapping machine as claimed in claim 6 wherein said axle is biased back to said first position upon completion of said selective interference.

8. An in line bale wrapping machine as claimed in claim 1 wherein said cutter severs only a portion of a width of the tensioned film.

9. An in line bale wrapping machine as claimed in claim 8 wherein a width of a cutting edge of said cutter is less than ½ of the width of the tensioned film.

10. An in line bale wrapping machine as claimed in claim 9 wherein said cutting edge is parallel to and offset from an axle of said cutter.

11. An in line bale wrapping machine as claimed in claim 8 wherein said cutter includes a cutting edge parallel to said tensioned film.

12. An in line bale wrapping machine as claimed in claim 8 wherein said portion of the width of the tensioned film is upstream of other portions of the width of the tensioned film in the direction of travel of the wrapping machine.

13. An in line bale wrapping machine as claimed in claim 10 wherein said tensioned film is severed while said tensioned film moves between said film tensioning structure and the bale.

14. A wrapping machine wherein:
   the machine includes a film cutter mounted on a frame of a film supply carriage;
   the carriage is rotationally carried by a rotary hoop support for rotation about an axis parallel to a direction of travel of the wrapping machine;
   the machine includes an object-receiving support which includes a film cutter actuator structure;
   the film cutter actuator structure is external to the film supply carriage; and
   the film cutter actuator structure operates in the direction of travel of the wrapping machine.

15. A wrapping machine for wrapping plastic film around an object, wherein:
   the object prior to being wrapped is hereinafter termed the unwrapped object, the object during wrapping is hereinafter termed the wrapping object, and the object after it has been wrapped is hereinafter termed the wrapped object;
   the machine includes a film-supply carriage;
   the film-supply carriage is mounted on a hoop-support for powered rotation about a carriage-axis;
   the machine is so structured that, in operation, the film-supply carriage rotates around the wrapping object;
   the carriage carries a reel of wrapping film;
   the machine is so structured that operational rotation of the carriage is effective to draw film from the reel and onto the wrapping object progressively as wrapping continues;
   the machine includes a film-cutter;
   the film-cutter is mounted on the carriage and is carried around with the carriage as the carriage rotates during wrapping;
   the film-cutter includes a cutter-blade and a trip-lever;
   the film-cutter is arranged for movement, relative to the carriage, between a cutting-position and a withdrawn-position;
   in the cutting-position of the film-cutter, the cutter-blade engages the film, and severs the film;
   in the withdrawn-position of the film-cutter, the cutter-blade is held clear of the film;
   the film-cutter includes a blade-spring which biases the film-cutter to its withdrawn-position;
   the machine includes a machine-frame upon which is carried a mechanical actuator-structure mounted in an actuator-hole in the machine-frame;
   an external-portion of the actuator-structure lies outside the machine-frame, and is accessible to a person operating the wrapping machine;
   an inside-portion of the actuator-structure is mechanically coupled to the external-portion and lies inside the machine-frame, and the wrapping machine is so structured as to deny a person physical access to the carriage and to the inside-portion of the actuator-structure during rotation of the carriage around the wrapping object;

the actuator-structure is so structured and so arranged in the machine that an operator, by physically moving the external-portion, can thereby move the inside-portion between a passive-position of the actuator-structure and a strike-position of the actuator-structure;

the machine includes an actuator-spring, which biases the actuator-structure to its passive-position;

during rotation of the carriage, the trip-lever of the film-cutter follows a circular path centered on the carriage-axis; and the machine is so configured that:
(a) when, during rotation of the carriage, the actuator-structure lies in its passive-position, the film-cutter lies in its withdrawn-position and no part of the machine strikes the trip-lever as the trip-lever follows its circular path;

(b) when the actuator-structure is moved to its strike-position, the inside-portion moves into the circular path of the trip-lever, whereupon:
  (i) the trip-lever, following the circular path, strikes the inside-portion of the actuator-structure;
  (ii) the film-cutter moves from its withdrawn-position to its cutting-position; and
  (iii) the cutter-blade engages with and severs the film.

16. A wrapping machine as claimed in claim 15 wherein:

the actuator-hole forms a guide for guiding operational movement of the actuator-structure; and when the actuator-structure is moved from its passive-position to its strike-position, the actuator-structure is guided by the actuator-hole in the machine-frame to move in a direction that is parallel to the carriage-axis.

* * * * *